Jan. 18, 1966     C. R. COPELAND     3,230,063
METHOD OF SHEARING GLASS
Filed Sept. 27, 1962     2 Sheets-Sheet 1
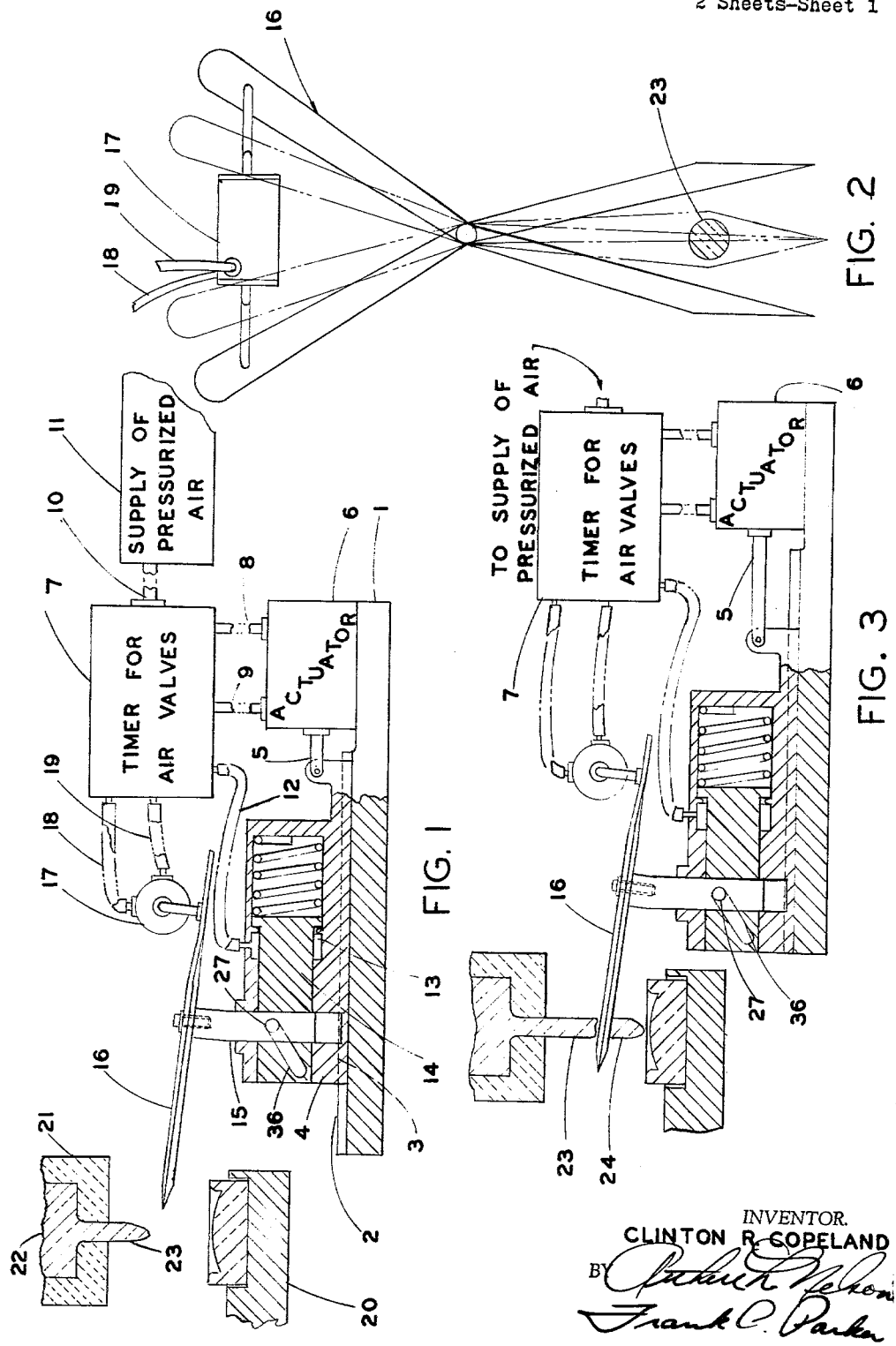
INVENTOR.
CLINTON R. COPELAND Jan. 18, 1966 C. R. COPELAND 3,230,063
METHOD OF SHEARING GLASS
Filed Sept. 27, 1962 2 Sheets-Sheet 2

INVENTOR.
CLINTON R. COPELAND
ATTORNEY

United States Patent Office 3,230,063
Patented Jan. 18, 1966

3,230,063
METHOD OF SHEARING GLASS
Clinton R. Copeland, East Rochester, N.Y., assignor to Bausch & Lomb Incorporated, Rochester, N.Y., a corporation of New York
Filed Sept. 27, 1962, Ser. No. 226,507
4 Claims. (Cl. 65—122)

This invention relates to glass making and more particularly to a method of shearing glass.

Making glass of ophthalmic quality is a highly specialized process. The method of forming a lens blank in a mold is usually preceded by shearing a stream of molten glass at intervals to form a gob of molten glass of the desired weight to form a lens blank. The glass initially must be of top quality and the effect of the shear mark must be completely eliminated.

The problem involved is in the heat transfer. If too much heat is absorbed in the shears the shear may become defective and fail to function properly. A more serious consideration is that the heat absorbed in the shears comes from the molten glass which if too great leaves a thermal history mark on the gob of glass causing a defective lens which must be rejected. If the shearing is not complete and clean in a single rapid operation, threads of glass may be formed which also due to the rapid cooling will cause a defective lens blank. Accordingly this invention is intended to overcome the problems involved in shearing a stream of molten glass to provide a lens blank consistently of optical excellence.

It is an object of this invention to provide a method of shearing of molten glass.

It is an object of this invention to provide a means for shearing molten glass.

It is another object of this invention to completely and rapidly sever a gob of molten glass and deposit the gob in a glass receiving means.

It is a further object of this invention to provide a method of severing molten glass to eliminate thermal history marks and such related defects in a lens element of optical excellence.

The objects of this invention are accomplished by providing a container of molten glass having an orifice for continuous flow for a stream of molten glass. A glass receiving means is disposed immediately below the orifice to receive the severed portion of the stream of molten glass. Intermediate the orifice and the glass receiving means a glass shears are reciprocated which operates on a predetermined time interval to sever a portion of the glass stream and deposit the portion on the glass receiving means. During the interim of the glass shearing operations the glass receiving means moves to a new station to permit replacement by a similar glass receiving means.

The glass shears as illustrated operate through the force of a pressurized fluid medium although any suitable operating means might be employed. The shears advance to a point intermediate the orifice and the glass receiving means and rapidly sever a portion of the stream of the molten glass and immediately move downwardly and away from the unsevered portion. The immediate downward movement of the shears accelerates the downward movement of the severed from the unsevered portion of the stream of molten glass reducing heat transfer from the glass stream. This reduces possibility of thermal history marks in lens blanks. The shears then pat the several portion in the glass receiving means to prevent any drawing of fibers or protrusion of any portions having small cross sections. The shears are then quickly withdrawn and elevated to its normally retracted position as the cycle is completed.

The operation of the shears go through a cycle of severing the portion of the molten glass and immediately depositing the molten glass in a portion of the mold and patting the glass in the mold and then withdrawing to its retracted position. In this manner the glass is sheared with a minimum time of contact between the shears and the glass and also the molten glass is concentrated in a compact gob to reduce any cooling effect or history mark causing a defective lens blank.

The drawings as illustrated show the preferred method of shearing molten glass although other means might be disclosed the preferred method is shown.

FIG. 1 illustrates the glass shears in its retracted position relative to the stream of molten glass.

FIG. 2 illustrates the shears in the forward position prior to shearing of the molten glass.

FIG. 3 illustrates the shearing of a portion of the stream of molten glass.

Figure 4:
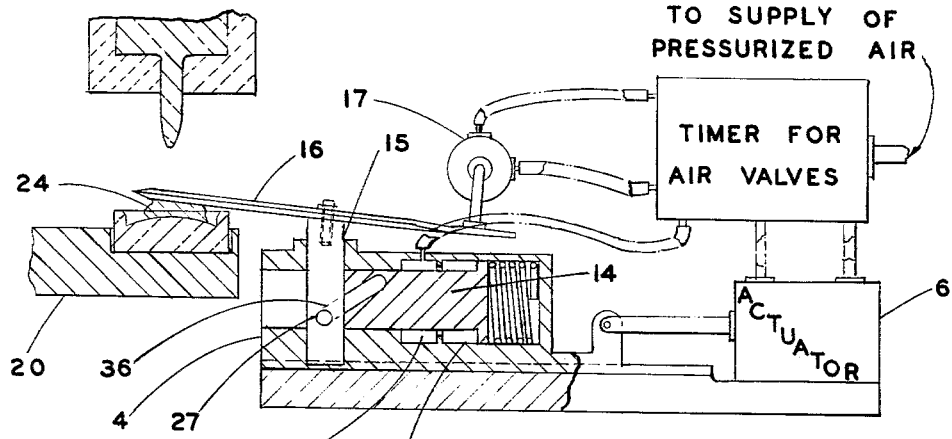
FIG. 4 illustrates a portion of the molten glass sheared and deposited in the glass mold.

Referring to the drawings the figures illustrate the cycle through which the shears operate to sever a portion of the stream of molten glass. The portion of the stream of molten glass is rapidly and completely severed and immediately guided into the mold. The time increment which elapses between shearing, patting and withdrawing of the shears is very short to reduce to a minimum the heat transfer from the molten glass to the shears. This is essential to provide a lens blank of optical excellence.

A support 1 is formed with a tongue 2 which is received within the groove 3 of a housing 4. The housing 4 is pivotally connected by the link 5 to the actuator 6. The actuator 6 is connected to the time 7 through the conduits 8 and 9. The timer is connected to the hose 10 to a supply of pressurized air 11. The supply of pressurized air 11 supplies the actuating medium for operating the shearing process. The hose 12 is connected to the air chamber 13 in the housing 4. As pressurized air is admitted in the air chamber 13, the sliding block 14 moves rearwardly and the pin 27 in the sliding block operating in the slot 36 causes the shears 15 and shears 16 to move downwardly as shown in FIG. 4.

The shears 16 is illustrated in more detail in FIG. 2. The shears is operated by an air cylinder 17 which is connected by the hoses 18 and 19 to the timer 7 for the air valves and is also pivotally connected to handles of the shears to operate the shears in response to the timing mechanism.

The shears 16 reciprocably operated intermediate the mold 20 for the lens blank and the container 21 containing the body of molten glass 22. The temperature of the molten glass in the container 21 is maintained at a suitable temperature to cause a continuous flow of a stream 23 of molten glass.

The opposite end of the shears which form the cutting edges are positioned on the opposing sides of the stream 23 in a position immediately prior to shearing of the molten glass.

FIG. 3 illustrates the shearing mechanism in the upper and forward position immediately after the gob 24 is severed from the stream 23. Immediately subsequent to shearing of the gob, the shears drop downwardly as illustrated in FIG. 4. The whole cycle of operation is controlled by the timer 7.

Referring to FIG. 4 the shears 16 have dropped due to a rearward movement of the block 14 in response to pressurized air in the chamber 13. In this position the pin 27 in the slot 36 moves to the forward end of the slot forcing the shears mount 15 to its lower position. In the position shown the actuator 6 holds the housing 4 to its forward position. The shears are still in its closed position as the gob 24 is patted in the mold 20.

Figure 5:
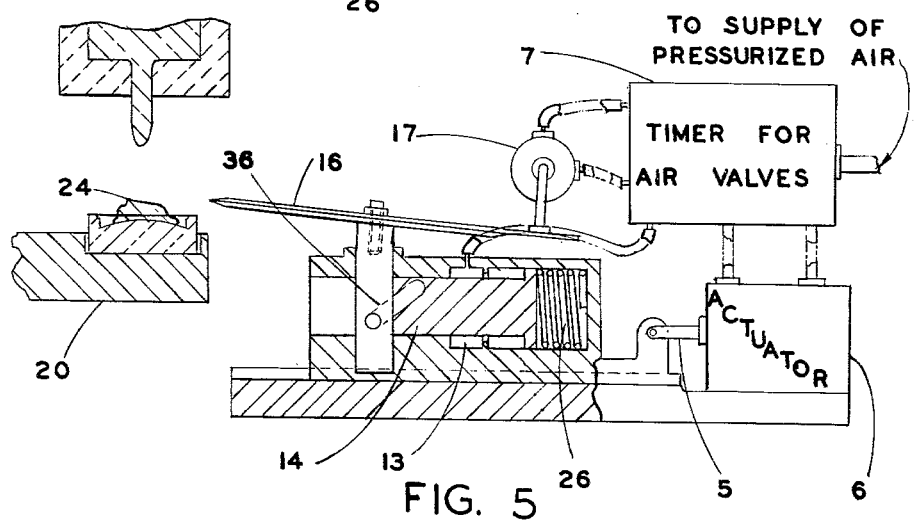
FIG. 5 illustrates the shears withdrawn from the mold subsequent to the patting of the molten glass in the mold.

The interval of time required for shearing and dropping is extremely short thereby reducing heat transfer from the glass to the shears. As the shears reach their lowest position as illustrated in FIG. 4 it is immediately withdrawn to the position shown in FIG. 5. Due to the incline position of the shears 16 a horizontal rearward movement to the position of FIG. 5 will cause the shears to clear the gob without dragging any of the molten glass as it moves rearwardly. The rearward movement is caused by the actuator 6 in response to the timer 7. The block remains in its rearward position causing the shears 16 to remain in their lower position. The shears are then opened and permitted to move upwardly to its normally retracted position as illustrated in FIG. 1. The air cylinder 17 opens the shears in response to the timer 7 and the spring 26 causes a forward movement of the block 14 as the air pressure in the chamber 13 is reduced. The position as illustrated in FIG. 1 is the completed position of the cycle.

Figure 6:
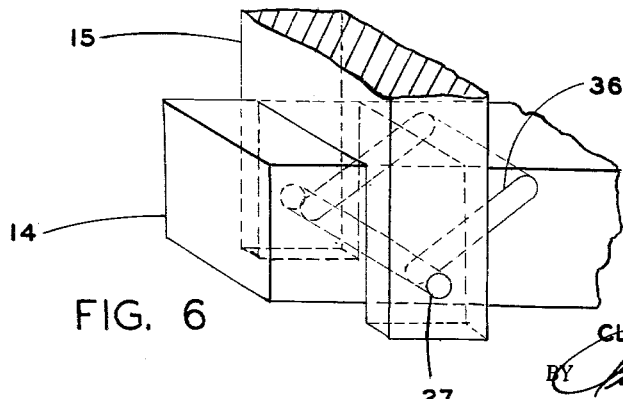
FIG. 6 is an enlarged fragmentary cross section view of the housing and sliding block which controls the vertical movement of the shears.

FIG. 6 illustrates an enlarged cross section view of the block 14 and the mount 15 which are connected by the pin 27. The horizontal reciprocating movement of the block 14 actuates the vertical movement of the mount 15.

The process illustrated in the drawings could be accomplished by various means such as solenoids electrically operated in response to a switching mechanism or any suitable actuating means which will accomplish the same effect. The drawings illustrate three motors connected through a timing mechanism to a supply of pressurized air and for the purpose of illustration is sufficient. The fundamental steps of the process are subsequently described. The shears 16 are in the open position as illustrated in FIG. 1 during its normally retracted position. The shears remain in the open position as it is moved forwardly by the actuator 6 in response to the timer 7. The shears remain horizontally in the same position as it moves forwardly.

A portion of the stream of molten glass 23 is then sheared by an operating force from the air cylinder 17 responsive to the timer 7. The shearing operation is rapid and complete to prevent any connection between the severed and unsevered portion of the stream of molten glass 23.

Immediately upon severing of the gob 24 from the stream of molten glass 23 the shears 16 drop away from the stream 23 in response to a rearward movement of the block 14 causing a shears mount 15 which supports the shears 16 to move downwardly. The immediate movement subsequent to shearing reduces heat transfer from the unsevered portion of the molten glass to the shears. The downward movement of the shears are sufficiently great to cause a patting of the gob as illustrated in FIG. 4. The time interval between shearing and patting is extremely short. The patting is an added refinement as illustrated however, where the shearing is clean the force of gravity will usually cause the severed portion to fall away from the shears with a minimum of heat transfer from the severed portion to the shears.

Immediately after the shears 16 pat the gob 24 in the mold 20 it is withdrawn by the rearward movement of the housing 4 due to a rearward movement of the link 5 responsive to the timer 7 controlling the flow of pressurized air to the actuator 6. The immediate movement of the shears subsequent to the downward movement reduces heat transfer from the severed portion of molten glass to the shears. The block 14 then moves forwardly in response to the biasing force of the spring 26 as the pressure in the air chamber 13 is decreased. The air cylinder 17 also opens the shears to the position illustrated in FIG. 2 thereby completing the cycle of the shears as the shears is returned to the position as illustrated in FIG. 1.

The preferred embodiment of the process and means for shearing glass has been illustrated and described, it is understood that other embodiments might be advised which would perform the same operation however they are believed to fall within the scope of the invention as illustrated and claimed in the following attached claims.

I claim:

1. A method of shearing a stream of molten glass for forming optical elements comprising, severing a portion of the stream of molten glass, immediately moving the severed portion downwardly from the unsevered portion of the stream of molten glass, depositing the severed portion of molten glass in a glass receiving means and simultaneously patting the severed portion to reduce the area exposed to cooling by the ambient air and thereby improve optical excellence in a lens element.

2. A method of shearing a stream of molten glass comprising the steps, severing a portion of a stream of molten glass, immediately downwardly removing the severed portion from the unsevered portion of the stream of molten glass, depositing the severed portion of the stream of molten glass in a glass receiving means, pressing the severed portion in the glass receiving means to eliminate any vertical extended portion having a small cross sectional area thereby preventing uneven cooling and thermal history marks on the severed portion.

3. A method of severing a stream of molten glass comprising, severing the lower portion of a vertical stream of molten glass, immediately downwardly moving the severed portion from the unsevered portion of the stream to prevent thermal history mark on the unsevered as well as severed portion on the stream of molten glass, depositing the severed portion of the stream of molten glass in a glass receiving means and simultaneously evening the upper surface of the severed portion as the severed portion is deposited in the glass receiving means and thereby eliminating thermal history mark caused by the severing operation.

4. A method of shearing a stream of molten glass for optical elements comprising the steps, severing a portion of a stream of molten glass, immediately downwardly accelerating the severed portion from the unsevered portion of the stream of molten glass to reduce heat loss from the severed and the unsevered portion, depositing the severed portion in a glass receiving means and simultaneously patting the severed portion in a glass receiving means to thereby eliminate thermal history mark in the severing operation.

References Cited by the Examiner

UNITED STATES PATENTS

| | | | |
|---|---|---|---|
| 669,524 | 3/1901 | Heerdt | 65—334 |
| 1,576,734 | 3/1926 | Ferngren | 65—334 |
| 3,075,371 | 1/1963 | Cooke et al. | 65—35 |

DONALL H. SYLVESTER, *Primary Examiner.*